M. B. WRIGHT.
Foot Stove.

No. 54,808.

Patented May 15, 1866.

UNITED STATES PATENT OFFICE.

M. B. WRIGHT, OF WEST MERIDEN, CONNECTICUT.

IMPROVEMENT IN FOOT-STOVES.

Specification forming part of Letters Patent No. 54,808, dated May 15, 1866.

*To all whom it may concern:*

Be it known that I, M. B. WRIGHT, of West Meriden, in the county of New Haven and State of Connecticut, have invented a new and useful Improvement in Combined Foot-Stove and Nurse-Lamp; and I do hereby declare that the following is a full, clear, and exact description thereof, which will enable others skilled in the art to make and use the same, reference being had to the accompanying drawings, forming part of this specification, in which—

Figure 1:
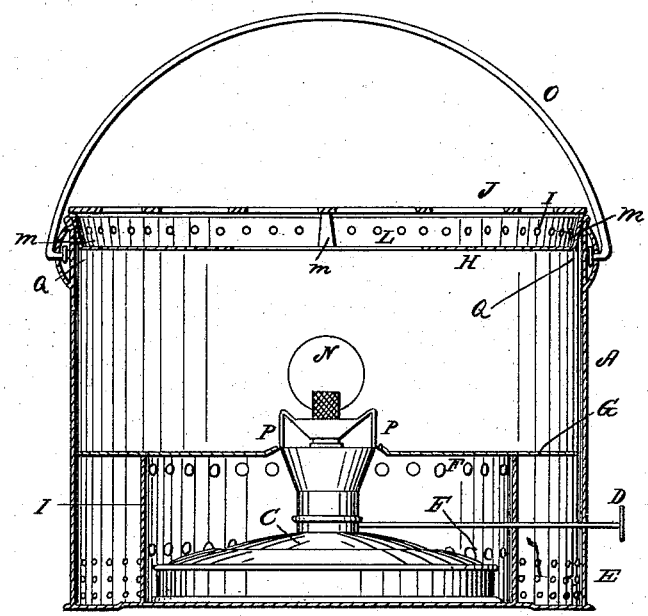
Figure 2:
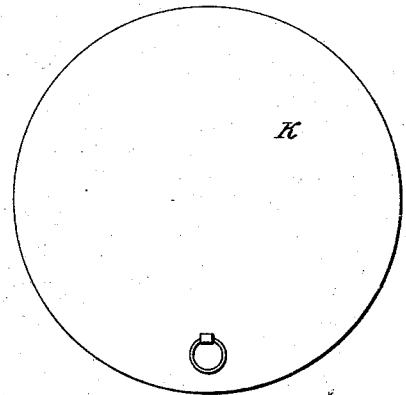

Figure 1 is a vertical section of a stove and lamp made according to my invention. Fig. 2 is a separate view of the plate which covers the suspended plate H when the apparatus is to be used as a foot-stove.

Similar letters of reference indicate like parts.

The object of this invention is to construct a combined stove and lamp in such a manner that it will burn a pure and sweet flame with kerosene-oil without the aid of a chimney, and which can, therefore, be used with comfort in a sick chamber without any offensive smell.

A designates the body of the apparatus, being a circular vessel with a close bottom and open top. Its sides, near its bottom, are perforated with numerous air-holes, E, which supply air to the lamp within.

Concentrically within the vessel A is a circular rim, B, of a height equal to the solid part of the burner of the lamp. This rim is also perforated, near both its upper and lower edges, with numerous holes, F. C is the lamp, which is placed within the circular rim B.

G is a circular plate, having an opening made in its center a little larger than the diameter of the burner of the lamp, so that when the plate is placed on the top of the rim B the burner of the lamp extends a little ways above the plate, and an annular space, P, is left between the burner and the bounds of the central opening of the plate, through which space the air that supports combustion is supplied.

An opening, N, is made in one side of the vessel A, at about the level of the top of the burner, so as to enable one to inspect the flame, said opening being provided with mica or other transparent material.

The thumb-rod D, which operates the wick, extends through one side of the rim B, and through the side of vessel A, so as to be convenient of access from without.

H designates a plate whose diameter is less than the internal diameter of the vessel A by a space, Q, said plate being suspended a little distance within the vessel by means of several hooks, m, formed on its edge, and which hooks take hold of the rim of the vessel in the way shown in the drawings. This plate H has a central opening, L, through which rays of heat from the lamp and the heated air can ascend with directness toward any article placed above it to be heated.

When the apparatus is used as a stove to warm the feet the plate K (see Fig. 2) is put on the plate H, so as to cover its central opening, L, and at such times the heated air and gases ascend through the annular space Q, and thence out of the apparatus above. When the apparatus is used to heat or cook any article the plate K is left off.

The top of the apparatus is provided with a movable grated or perforated plate J, which is so open as to allow a free passage for the heated air and gases of the lamp, while it prevents one's feet from coming in contact with the hot plate H below.

The upper edge of the vessel A has a series of perforations, I, extending around it to allow the gases to escape when any large vessel is placed on the grate J or on the plate L.

When one is carrying the lamp through an apartment the flame will not be affected to make the lamp smoke or to put it out, because the inclosing-rim B protects it from a sudden access of air, and the annular space P, around the burner, will continue to supply air to the wick from the same direction as when the lamp is kept still. The hoop or rim B holds the lamp in place, supports the dividing-plate G at a proper height, and protects the flame of the lamp from a sudden rush or access of air when the lamp is moved.

Having thus described my invention, I claim as new and desire to secure by Letters Patent—

The arrangement of the movable perforated plate G, rim B, lamp C, movable hanging plate H, and movable grate J, in combination with the perforated vessel A, constructed and operating in the manner and for the purpose herein described.

M. B. WRIGHT.

Witnesses:
GEO. W. SMITH,
M. B. RENSLOW.